Sept. 15, 1936.   R. C. BETTS   2,054,406
UNIVERSAL BAG MACHINE
Filed Feb. 20, 1933   3 Sheets-Sheet 1
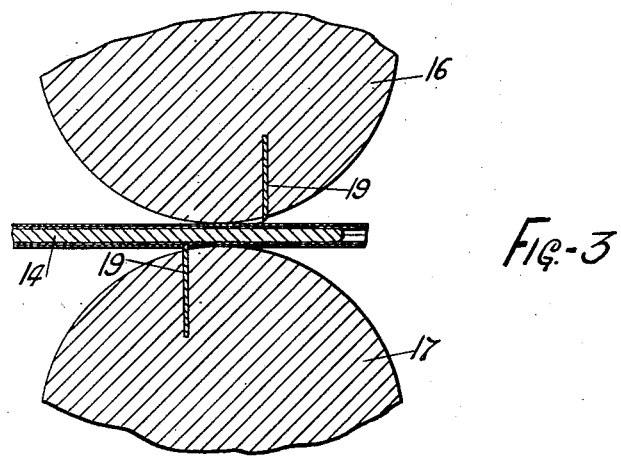
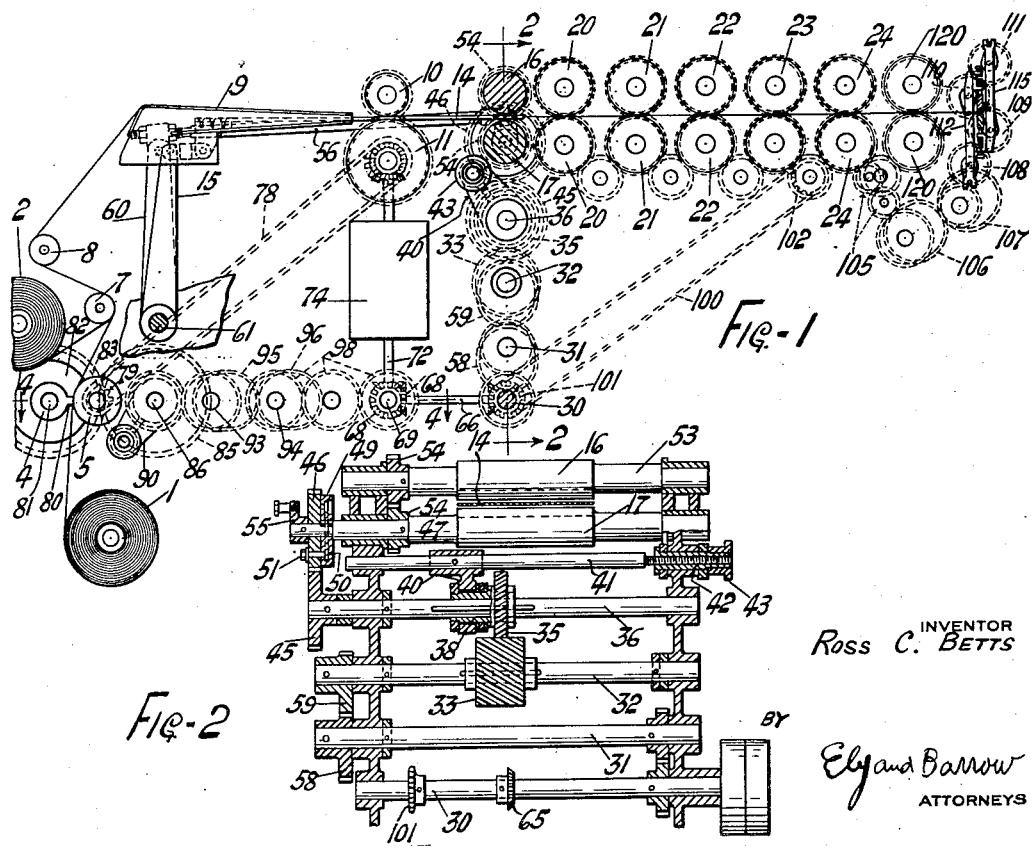

Sept. 15, 1936.  R. C. BETTS  2,054,406
UNIVERSAL BAG MACHINE
Filed Feb. 20, 1933  3 Sheets-Sheet 2

INVENTOR
Ross C. Betts

BY
Ely and Barrow
ATTORNEYS

Sept. 15, 1936.　　　R. C. BETTS　　　2,054,406
UNIVERSAL BAG MACHINE
Filed Feb. 20, 1933　　　3 Sheets-Sheet 3
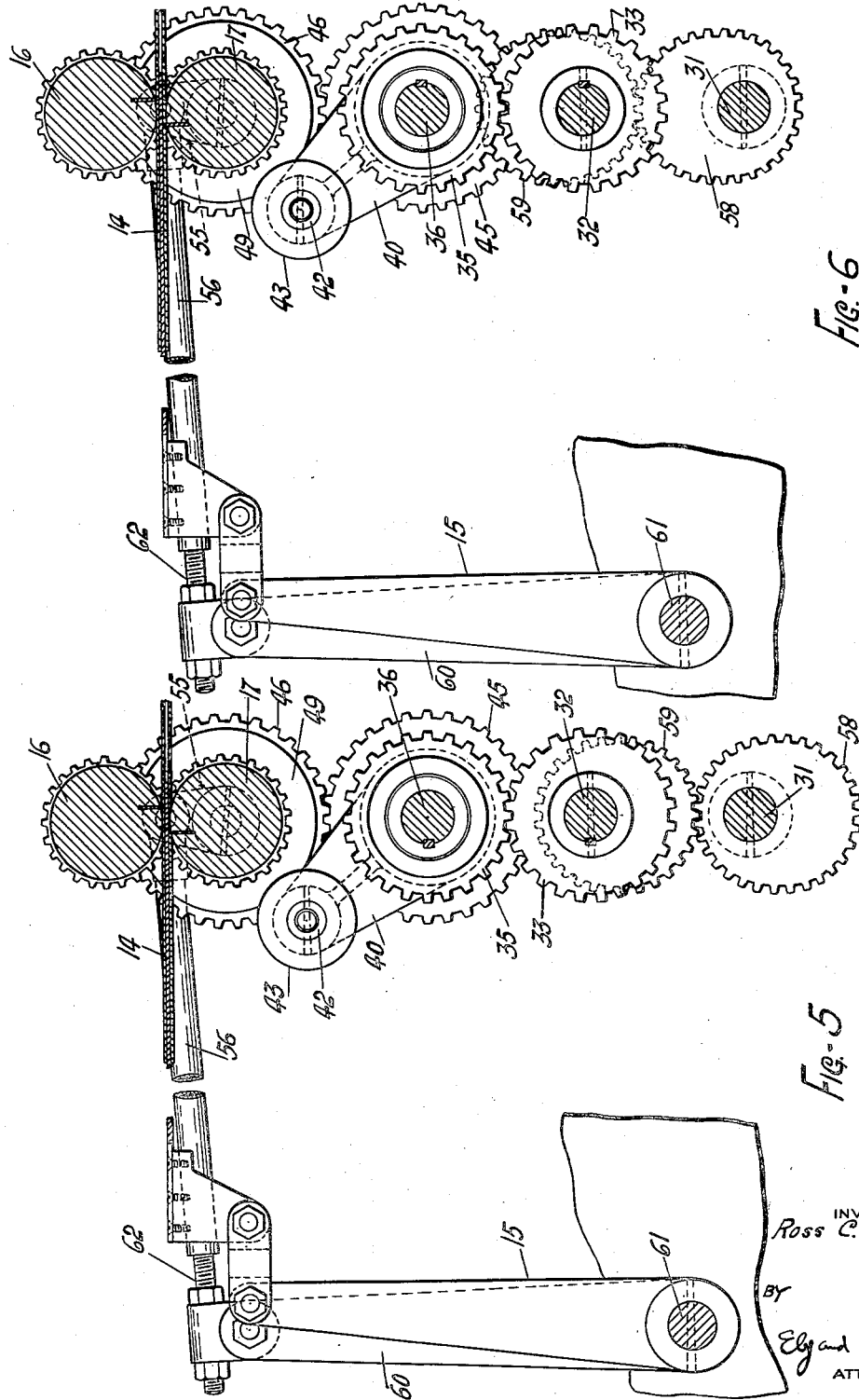

Patented Sept. 15, 1936

2,054,406

UNITED STATES PATENT OFFICE 2,054,406

UNIVERSAL BAG MACHINE

Ross C. Betts, Lakewood, Ohio, assignor to The Dobeckmun Co., Cleveland, Ohio, a corporation of Ohio Application February 20, 1933, Serial No. 657,519

15 Claims. (Cl. 93—8)

The present invention relates to the manufacture of bags, envelopes, tubes, or the like, from continuous webs of paper, glassine or cellophane, and while it is particularly designed and intended for use in the manufacture of bags from "Cellophane", it is capable in certain aspects of further and more extended utility.

The machine is designed to form a continuous tube from a web of the material and to gum and cut the tube in the requisite lengths for the individual bags. In the manufacture of these bags for use in the display of a large variety of articles, the sizes are varied over a considerable range, and it is the purpose of the invention to devise a machine which is capable of rapid adjustment, and with accuracy, particularly such as required in the cutting of cellophane. In the manufacture of bags or similar articles from paper, accurate adjustments are not so essential, but in the handling of sheets or webs of cellophane or similar regenerated cellulose products, it is essential that the various elements of the machine move in conformity with the speed of the web; otherwise tearing or shattering of the web will result.

It is an object of the invention, therefore, to devise a machine of the type described in which the requisite adjustments can be accurately made with the minimum of attention and labor, so that the machine is capable of quick and easy adjustment. In the particular machine shown herein, it is possible to adjust the mechanism so that bags from 13½ inches in length to 5 inches in length can be produced with only simple adjustments quickly secured.

The machine also comprises adjusting means of the same type as that employed for the cutter rolls for driving an applicator roll such as a laminating gum applying roll, so that the adjustment of the latter is accomplished in the same general manner.

It is a further object of the invention to provide a compact heat sealing mechanism which can be located between pairs of bag transfer or delivery rolls without requiring that these rolls be spaced too far apart for properly handling and delivering the shortest bag to be made upon the machine. The heat sealing means must travel at a speed equal to the speed of travel of the bag, and the novel mechanism shown permits this speed to be attained in the space which is available.

It will be appreciated that the invention is described in one form or embodiment only, it being evident that the principles thereof may be applied to other forms in that changes and improvements may be made without sacrificing any of the benefits of the invention.

In the drawings in which the best known or preferred form of the invention is shown:

Fig. 1 is a longitudinal sectional view through a bag machine having the invention incorporated therein, the view being somewhat diagrammatic as the details of drive and supporting units are more or less standard and have no effect upon the principles of the invention;

Fig. 2 is a vertical section on the line 2—2 of Fig. 1, showing the means for bringing the knife or cutter travel in conformity with varying speeds of the web as dictated by the sizes of bags to be produced;

Fig. 3 is an enlarged detail of the cutter rolls at the moment of operation;

Fig. 5 is an enlarged sectional view showing the machine as set for the shortest bags for which the machine is adapted;

Fig. 6 is a similar view showing the setting for the longest bags; and

Figure 4:
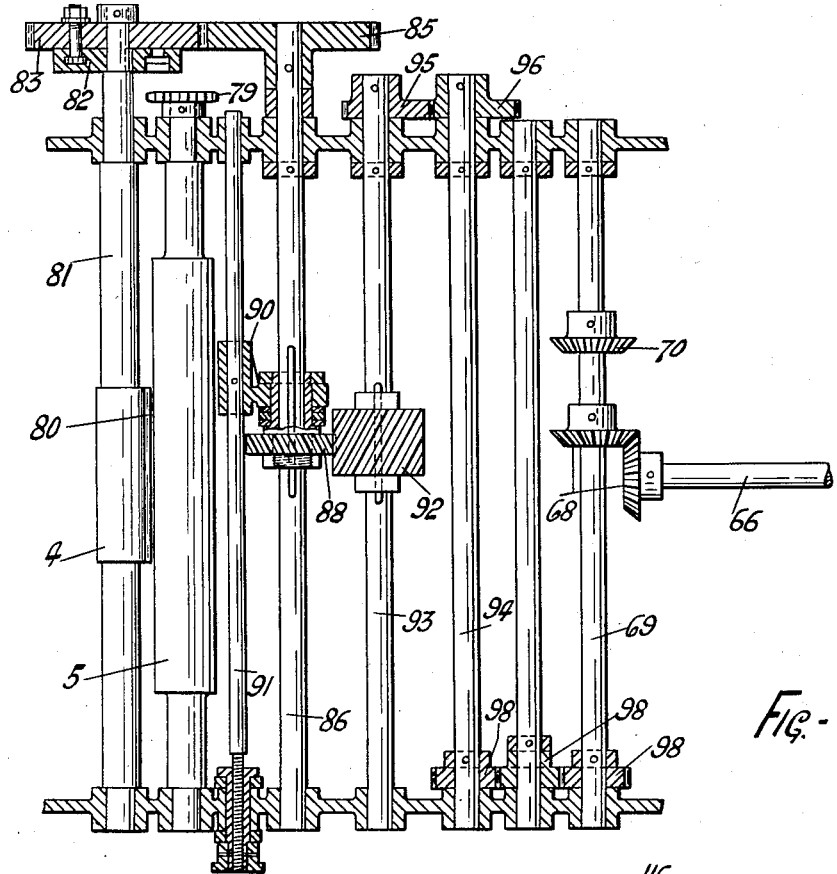
Fig. 4 is a horizontal section on the line 4—4 of Fig. 1.

The machine is illustrated as set up for making double walled bags; that is, bags of two layers of material, hereinafter referred to as cellophane. One roll of the material is designated by the numeral 1, and the other by the numeral 2, the former being the inner layer or ply, and the latter the outer layer. One of the webs, here shown as the web 1, is passed between rolls 4 and 5, the former being an applicator roll for applying strips or bars of glue to the web supported by the roll 5. The machine is not necessarily to be employed in the manufacture of double walled bags. In the making of single wall bags, only one web is supplied to the machine and the rolls 4 and 5 are not used.

The two plies, or webs, pass over guide rolls 7 and 8, as a single web, and thence to a tuber or former 9, over which the web is formed in the requisite cross sections, as is well understood in this art. From the former, the stock, folded in tubular form, passes between the upper and lower draw rolls 10 and 11, which are geared together and thus control the surface speed of the stock. Located within the tube is the mandrel, or shuttle 14, which is reciprocated in timed relation to the travel of the web during the cutting operation. The mandrel is attached at its rear end to an arm 15 by which it is reciprocated, the forward movement of the mandrel taking place during the operation of the cutters. The upper and lower cutting rolls are indicated at 16 and 17 and carry the usual knife blades 19, which cut the stock upon the mandrel. After the bags are severed from the leading end of the tube or web they are passed in succession through pick up rollers 20, separator rollers 21, gumming rollers 22, creasing rollers 23 and ironing rollers 24, which turn down the forward end of each bag blank and prepare it for the final sealing operation.

The last named operation is performed by two heated sealing and pressure bars indicated at 26, which meet and travel with the web for a short distance and during a sufficient interval to complete the sealing operation. Where moisture-proofed cellophane or other stock coated with a moisture-proofing is used, the heated bars serve to melt the coating and further assist in the sealing. If a laminated bag is to be made of layers of moisture-proofed and non-moisture-proofed cellophane, the heated sealing bars unite the layers together. As noted above, it is important that these bars move at the same speed as the bags which have been severed at the cutting rolls.

In adapting this machine for different sizes of bags the speed of the web is increased or diminished to make longer or shorter bags respectively. The number of revolutions per minute of the cutting knives is maintained for all sizes.

The difficulties arise in obtaining a speed of the various elements which are called into play at the cutting operation. It is essential that the speed of the stock and the speed of the cutting instrumentalities be the same at the cutting moment, otherwise the stock will tear or break. In actual operation it is desirable to have the knives move at slightly less speed than the stock so that a slight buckling of the stock is created, but the difference in speed is so slight as to be practically imperceptible, and when the speeds of the knives and the stock at cutting are described as the same, it will be understood that slight variations may occur in actual practice, but the variations are so slight that no harmful results flow therefrom. It is also essential that the mandrel move at the cutting moment at stock speed, and thus at knife speed.

Heretofore the only way in which the desired results were obtained in practice was by extensive adjustments throughout the machine, and these adjustments consumed much time, kept the machine out of production, and oftentimes were made inaccurately and imperfectly.

In the machine which is illustrated herein, the main drive shaft is indicated at 30, which through countershaft 31, drives the shaft 32 which supports and drives the helical gear 33. This gear is for the purpose of securing the fine adjustments of the machine as will later be described. It is of substantial breadth and is engaged by a narrow helical spur gear 35 which is shiftable along the gear 33. The gear 35 is splined to the shaft and is supported upon the sliding sleeve 38 by which it is movable to and fro for the adjustment. The sleeve 38 is held and moved by an arm 40 secured to a longitudinally movable rod 41 slidable in the machine frame, one end of the rod being screw threaded and received in a sleeve 42 which is actuated by a nut 43.

The shaft 36 carries at one end a gear 45 which meshes with a gear 46 rotatably mounted on the shaft 47 of the lower cutter roll 17. Keyed on the shaft 47 against a face of the gear 46 is a disk 49 which is formed with a T-shaped circular slot 50 in which are received the heads of bolts 51, by which the disk and the gear are fastened together in any relative axial adjustment. The cutter roll and the shaft may then be turned to bring the knives at any point on the circumference of the gear. The shaft 47 of the roll 17 is geared to the shaft 53 of the roll 16 by gears 54. To the outer end of the shaft 47 is pinned the crank 55 which is connected by the link 56 to the mandrel.

Referring now to the shafting, attention is directed to the intermeshing elliptical gears 58 on the shaft 31, and 59 on the shaft 32. It will be evident that when the gear 58 has its shortest axis coincident with the largest axis of the gear 59, the speed of the shaft 32, and consequently the speed of the cutter rolls will be at their slowest in one cycle. When the elliptical gears are reversed, however, the cutter rolls will be moving at their top speed in a cycle. By changing the adjustment of the rolls 16 and 17 and their shafts with respect to the gear 46, the knives may be brought together, or in their cutting positions at any point in a single cycle of increasing or decreasing shaft speed due to the operation of the elliptical gears.

It will thus be seen, that by the combination of a variable speed of rotation of the cutter roll shaft, which occurs in regular cycles, and by the shifting of the knife to different positions in that varying cycle, it is possible to obtain a considerable range and selection of knife speeds at the cutting moment, and this adjustment and control is accomplished with a single simple adjustment. Any suitable mechanical device for securing the variations in a cycle may be employed and come within the scope of the invention, but elliptical gearing is a simple and effective means of securing this result. The shifting of the rolls is a means of obtaining a fairly close adjustment, but for the fine adjustments the helical gear 33 is employed after the disk 49 and gear 46 are locked together.

The extent of adjustment is shown by a comparison of Figs. 5 and 6. In Fig. 5, the cutters are shown at their cutting position when the short axis of the gear 58 is presented to the long axis of the gear 59, and in this position the knives at the cutting moment are moving at their slowest speed. In this position the machine is set for cutting the shortest bag when the stock is moving at its slowest speed. In Fig. 6, the conditions are reversed, and the cutting moment of the knives occurs when the long axis of the gear 58 is presented to the shortest axis of the gear 59. In this position the machine is set for cutting the longest bag. It will be evident that any variations between these two settings are possible.

It is also required that the shuttle or mandrel 14 be moved in substantial conformity with the speed of the stock, and this is accomplished by the crank 55 and the link 56, the former being pinned to the shaft 47 so that the point of connection with the link 56 is always in register with the knives. The actuation of the crank will thus conform exactly to the speed of the cutter rolls throughout the entire cycle. The link 56 is connected to the lever 15 by the pivoted arm 60 through the rock shaft 61 on which the lever 15 is supported. Adjustable connections 62 are provided between the link 56 and the arm 60 so that the cutting point on the mandrel may be shifted.

The rolls 10 and 11 which draw the stock over the former and feed it into the cutter rolls are driven from the shaft 30 by the mitre gear 65, counter shaft 66 and bevel gears 68, which rotate the shaft 69. This shaft carries a bevel gear 70 from which the roll 11 is driven by shaft 72 through an adjustable speed unit indicated at 74. This may be any standard form of adjustable and variable speed transmission, the details of which are nonessential.

Taking, for example, the setting shown in Fig. 1, which is for the shortest bag, should a longer bag be ordered, the variable speed unit is set to give the requisite web speed for obtaining the longer bag with the fixed number of cuts per minute. The cutter rolls are then set, by the relation of the disk and gear and then by the helical gears, so that their relation to the elliptical gears will bring the knives to cutting position at the moment when their speed approximates or equals the stock speed. As explained, this also takes care of the shuttle or mandrel speed. This constitutes a simple and effective means of securing accurate, synchronous movement of stock, cutter and mandrel.

As noted above, it is also essential that the laminating gum applying roll be run at the same speed as the web at the moment of application, and this result is accomplished in a similar manner to that employed for driving the cutter rolls. This will now be described.

The backing up roll 5 is operated directly from the variable speed unit by a chain 78 which runs over a sprocket 79 on the shaft of the backing roll 5. The gum applying roll 4 is provided with a gum applying bar 80 which obtains its supply of gum from rolls and a fountain (not shown). The shaft 81 of this roll has keyed thereto a disk 82 which is adjustably connected to the driving gear 83 in the same manner as the gear 46 and disk 49 on the cutter roll, so that the gum applying bar can be located at any desired point with respect to its driving gear. The gear 83 meshes with a similar gear 85 on the cross-shaft 86 which is provided with a helical gear 88 similar to the helical gear 35 and shiftable by the arm 90 on the shaft 91 so as to secure the fine adjustment by shifting the gear 88 along the helical gear 92 on the shaft 93. The shaft 93 is driven from the shaft 94 by means of the intermeshing elliptical gears 95 and 96 on the shafts 93 and 94, respectively. These gears impart the variable speed to the gum applying roll which is adjusted in the manner described with respect to the cutter rolls. The shaft 94 is driven through gearing 98 from the shaft 69.

The instrumentalities following the cutter rolls are distinct therefrom as to the drive except that they receive power from a chain 100 passing over sprocket 101 on the main drive shaft 30. The chain 100 operates a sprocket 102 which drives the several rolls 20 to 24 inclusive. The hot sealing iron or bars 26 are driven from the roll 24 by idler gearing 105 and elliptical gearing 106 and 107, the latter driving the group of gears 108, 109, 110 and 111 which comprise the hot sealing drive. As shown more in detail in Fig. 7, the gears 108 and 110 are connected by rod 112 supported from cranks 114 on the gears, and the gears 109 and 111 are connected by rod 115 supported from cranks 116 on the gears. The rods 112 and 115 move together in unison, as will be seen, and support lower and upper sealing bars 118 and 119, respectively, which are heated. The bars are spring mounted so that they will yield as they contact through the stock, and thereby meet and travel with the bag for a distance sufficient to effect the final seal.

Figure 7:
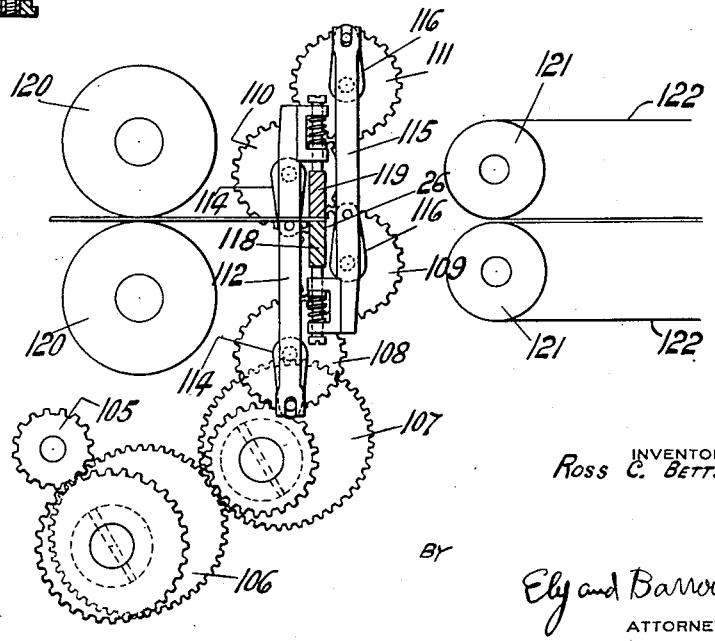
Fig. 7 is an enlarged view of the heat sealing unit at the delivery end of the machine.

As the bags are separated from the web at the cutter rolls, the speed at which the bags are passed through the subsequent operations is the same for long and short bags, and for this reason the operating instrumentalities are driven at the maximum speed for the longest bag. It is essential, however, that the space occupied by the sealing unit permit the shortest bag to be handled. As the sealing means must be driven at top speed, it has been somewhat difficult to design a drive for these devices which could be accommodated in the short space allowed and yet secure this maximum speed. The elliptical gears 106 and 107 secure the desired result, the gears being set so that the maximum speed is derived from the gearing at the time that the sealing operation is taking place. This is shown in Figs. 1 and 7 when the long axis of the driving gear 106 is presented to the short axis of the driven gear 107 at the point of sealing.

For this purpose a pair of auxiliary feeding rolls 120 may be located between the rolls 24 and the heat sealing devices, but these rolls may be omitted and the sealing mechanism placed immediately adjacent the rolls 24, the mechanism shown permitting this arrangement. The final delivery rolls 121 and tapes 122 are located close to the heat sealing unit.

The mechanism shown herein is efficient and accurate and capable of adjustment to the exact requirements for handling delicate and easily destructible webs, such as cellophane, without breakage or tearing of the web. The adjustments are easily secured and may be made in a fraction of the time required for adjusting prior machines. Every operation is accurately timed to conform to the speed of the web. The production possible of attainment in this machine exceeds former machines for it is possible within safe limits of stock speed to secure a greater number of bags than with former machines. Danger of tearing and breakage of stock and faulty production is reduced to a minimum.

It will be understood that in referring to the claims to equal speeds of the various instrumentalities employed that these speeds may vary slightly and such minor inequalities are understood to be covered herein. It has previously been noted that the speed of the stock may be fractionally higher than the actual knife speed, so that a slight buckling may occur at this point, and this is not objectionable but even desirable, so that the claims are to be considered with this reservation. Instead of shifting the cutter rolls, and other instrumentalities, it is possible to shift the elliptical gears to secure the same results, and the invention is of sufficient breadth to cover this variation therein. Other changes, modifications or improvements may be made in machines which embody the invention herein set forth and claimed, it being understood that these are within the scope of the claims and the fair construction thereof, as permissible by the prior art. It is also possible that the invention may be adapted for other machines than the type illustrated herein, and it is not intended that the invention be confined to the specific machine, or type of machine, shown herein.

What is claimed is:

1. In a machine for the uses and purposes set forth, draw rolls to advance the stock, variable speed mechanism to drive the draw rolls, means for forming the stock into a tube, a mandrel within the tube and movable longitudinally thereof, a pair of cutter rolls revoluble at a determined number of revolutions, means to vary the speed of the cutter rolls during a single revolution, the cutter rolls being adjustable to bring the cutters therein into cutting position on the stock at different points in the recurrent cycles thereof, and means for moving the mandrel at substantially the surface speed of the cutting rolls at the cutting moment.

2. In a machine for the uses and purposes set forth, means for advancing the stock at variable speeds, a tube forming device and a reciprocating mandrel located within the tube, cutting mechanism movable with the stock during the cutting operation, operable to make a fixed number of cuts per minute whereby the lengths of stock cut may be varied, means correlating the speed of the cutting mechanism and the speed of the stock at the cutting moment, comprising means for driving the cutting mechanism at varying speeds in a single cycle thereof, the cutters being shiftable to various operative points in the cycle, and means for moving the mandrel at substantially the speed of the cutting mechanism at the cutting moment.

3. In a machine for the uses and purposes set forth, means for advancing the stock at variable speeds, a cutter and a mandrel movable with the stock during the cutting operation, and operable to make a fixed number of cuts per minute whereby the lengths of stock cut may be varied and means for correlating the speed of the cutter and the speed of the stock, and the speed of the cutter and mandrel at the cutting moment, comprising means for driving the cutter and moving the mandrel at varying speeds in a single cycle thereof, and means for shifting the cutter and the mandrel in relation to the cycle.

4. In a machine for the uses and purposes set forth, cutter rolls and an applicator roll movable in cycles of differing velocities, variable stock feeding means, the cutter rolls and applicator roll being shiftable to bring them in operative relation to the stock at selected points in the variable cycles thereof.

5. In a machine for the uses and purposes set forth, cutter rolls, a mandrel and an applicator roll movable in cycles of differing velocities, variable stock feeding means, the cutter rolls, mandrel and applicator roll being shiftable to bring them into operative positions with the stock at selected points in the variable cycles thereof.

6. In a machine for the uses and purposes set forth, variable stock feeding means, a reciprocating mandrel, rotatable cutter rolls, elliptical gears to drive the cutter rolls, the cutter rolls being shiftable about their axis to bring their cutters into operative relation to the stock at selected points in the cycles of the elliptical gears, and means for moving the mandrel at substantially the speed of the cutters at the cutting moment.

7. In a machine for the uses and purposes set forth, variable stock feeding means, a movable mandrel, a rotatable roll operable in conjunction with the mandrel contacting with the stock at one point in a cycle thereof, the speed of each cycle being variable, the machine being adjustable to bring the operative point of the roll at differing locations in the cycle, the mandrel being movable at approximately web speed during the operation of the roll.

8. A bag making machine comprising web feeding and forming means, means for varying the speed of the web, a pair of rolls having cutter bars thereon, elliptical gears for driving the rolls, the cutter bars being shiftable about the axes of the rolls to bring them into contact with the web while moving at speeds approximating the speed of the web in varying adjustments of the feeding means and a movable mandrel in contact with the web, said mandrel also moving at the approximate speed of the web at the time the cutter bars are operative.

9. A bag making machine comprising web feeding and forming means, means for varying the speed of the web, a pair of rolls having cutter bars thereon, elliptical gears for driving the rolls, the cutter bars being shiftable about the axes of the rolls to bring them into contact with the web while moving at speeds approximating the speed of the web in varying adjustments of the feeding means, and relatively shiftable helical gears between the elliptical gears and the rolls.

10. A bag making machine comprising variable web feeding means, a roll having a cutter bar thereon, a mandrel movable with the stock and means for bringing the speed of the roll and mandrel into conformity with the speed of the stock at cutting time, comprising elliptical driving gears for the roll and mandrel, and means for shifting the relative axial positions of the gears and the roll and mandrel.

11. A bag making machine comprising variable web feeding means, a pair of rolls having cutter bars thereon, means for adjusting the rolls at various relative axial positions, a pair of helical gears to drive the rolls, and means for shifting one of said gears along the other to change the operative point of the cutter bars.

12. A bag making machine comprising variable web feeding means, a pair of rolls having cutter bars thereon, means for adjusting the rolls at various relative axial positions, a pair of helical gears to drive the rolls, and means for shifting one of said gears along the other to change the operative point of the cutter bars, and a pair of elliptical gears driving the helical gears.

13. A bag making machine comprising variable web feeding means, a pair of cutter rolls, and a reciprocating mandrel movable between the cutter rolls, a crank for actuating the mandrel, the point of connection of the mandrel and the crank being coincident with the cutters, a pair of helical gears to drive the rolls and the mandrel and means for shifting the cutting point about the axis of the cutter rolls so as to bring its operating moment at different points with respect to the helical gears.

14. A bag making machine comprising variable web feeding means, an adhesive applicator roll movable over the web, elliptical gears to operate the roll, means for shifting the roll into different operative positions with respect to the elliptical gears, means for forming the web into a tube, and cutting the tube into bag blanks, and means for folding and sealing the end of a blank at the point of application of the adhesive.

15. In a bag making machine, variable speed draw rolls, tube forming means, a reciprocating mandrel located in the tube, cutter rolls above and below the mandrel which moves with the rolls and the web during the cutting operation and means for bringing the movement of the web, mandrel and cutting rolls into substantial conformity at cutting time comprising a mechanical device having repeated cycle movement of increasing and diminishing speeds, such as elliptical gears, located in the drive for the rolls and mandrel, said instrumentalities being shiftable with respect to the gears to bring their operative moments at different points in a cycle.

ROSS C. BETTS.